US 9,172,565 B2

(12) United States Patent
Cadugan et al.

(10) Patent No.: US 9,172,565 B2
(45) Date of Patent: Oct. 27, 2015

(54) SIGNALING BETWEEN MASTER AND SLAVE COMPONENTS USING A SHARED COMMUNICATION NODE OF THE MASTER COMPONENT

(71) Applicant: Allegro Microsystems, LLC, Worcester, MA (US)

(72) Inventors: Bryan Cadugan, Bedford, NH (US); Michael C. Doogue, Bedford, NH (US); Mark J. Donovan, Derry, NH (US)

(73) Assignee: Allegro Microsystems, LLC, Worcester, MA (US)

( * ) Notice: Subject to any disclaimer, the term of this patent is extended or adjusted under 35 U.S.C. 154(b) by 0 days.

(21) Appl. No.: 14/182,595

(22) Filed: Feb. 18, 2014

(65) Prior Publication Data

US 2015/0236876 A1    Aug. 20, 2015

(51) Int. Cl.
*H04B 14/04* (2006.01)
*H04L 25/03* (2006.01)
*H04L 7/04* (2006.01)

(52) U.S. Cl.
CPC .......... *H04L 25/03834* (2013.01); *H04L 7/042* (2013.01)

(58) Field of Classification Search
None
See application file for complete search history.

(56) References Cited

U.S. PATENT DOCUMENTS

| | | | |
|---|---|---|---|
| 3,074,636 A | 1/1963 | Baker et al. | |
| 5,361,260 A | 11/1994 | Mito | |
| 5,574,849 A | 11/1996 | Sonnier et al. | |
| 5,606,717 A | 2/1997 | Farmwald et al. | |
| 5,646,609 A | 7/1997 | O'Brien | |
| 5,675,811 A | 10/1997 | Broedner et al. | |
| 5,689,689 A | 11/1997 | Meyers et al. | |
| 6,118,186 A | 9/2000 | Scott et al. | |
| 6,233,534 B1 | 5/2001 | Morozumi et al. | |
| 6,426,916 B2 | 7/2002 | Farmwald et al. | |
| 6,522,944 B2 | 2/2003 | Wielebski et al. | |
| 6,542,847 B1 | 4/2003 | Lohberg et al. | |
| 6,563,419 B1 | 5/2003 | Herz et al. | |
| 6,618,628 B1 | 9/2003 | Davlin et al. | |
| 6,687,644 B1 | 2/2004 | Zinke et al. | |
| 6,701,214 B1 | 3/2004 | Wielebski et al. | |
| 6,715,020 B2 | 3/2004 | Farmwald et al. | |
| 6,728,819 B2 | 4/2004 | Farmwald et al. | |
| 6,751,696 B2 | 6/2004 | Farmwald et al. | |
| 6,825,625 B1 | 11/2004 | Karwath et al. | |

(Continued)

FOREIGN PATENT DOCUMENTS

DE    100 30 358 A1    6/2000
DE    102 03 483 A1    5/2001

(Continued)

OTHER PUBLICATIONS

Infineon Technologies, Application Note for part TLE4998C, Rev. 1.0, Feb. 2009 "User Programming Guide", 30 pages.

(Continued)

*Primary Examiner* — Adolf Dsouza
(74) *Attorney, Agent, or Firm* — Daly, Crowley, Mofford & Durkee, LLP

(57) ABSTRACT

In one aspect, a system includes a master component having a communication node; and a plurality of slave components. Each slave component has a bidirectional node. The slave components are configured to each store data in response to a trigger signal received at the bidirectional node from the communication node.

34 Claims, 6 Drawing Sheets

(56) References Cited

U.S. PATENT DOCUMENTS

| | | |
|---|---|---|
| 6,838,999 B1 | 1/2005 | Ropke |
| 6,952,618 B2 | 10/2005 | Davlin et al. |
| 6,975,558 B2 | 12/2005 | Farmwald et al. |
| 7,038,412 B2 | 5/2006 | Karwath et al. |
| 7,110,322 B2 | 9/2006 | Farmwald et al. |
| 7,158,900 B2 | 1/2007 | McNutt |
| 7,191,269 B2 | 3/2007 | Cluff |
| 7,207,014 B2 | 4/2007 | Velasco et al. |
| 7,209,997 B2 | 4/2007 | Farmwald et al. |
| 7,254,452 B2 | 8/2007 | Davlin et al. |
| 7,366,115 B2 | 4/2008 | Vandensande |
| 7,366,597 B2 | 4/2008 | Hartrey et al. |
| 7,466,123 B2 | 12/2008 | Kato et al. |
| 7,558,646 B2 | 7/2009 | Matsumoto et al. |
| 7,668,674 B2 | 2/2010 | McNutt et al. |
| 7,717,085 B1 | 5/2010 | Bauerle |
| 7,761,251 B2 | 7/2010 | Bauerle |
| 7,774,074 B2 | 8/2010 | Davlin et al. |
| 7,877,208 B1 | 1/2011 | Battista |
| 7,990,983 B2 | 8/2011 | Denham |
| 7,996,104 B2 | 8/2011 | Wielebski et al. |
| 8,122,159 B2 | 2/2012 | Monreal |
| 8,290,094 B2 | 10/2012 | Kolof et al. |
| 8,461,782 B2 | 6/2013 | Ward et al. |
| 8,543,263 B2 * | 9/2013 | Danielsson et al. ............... 701/3 |
| 8,577,634 B2 * | 11/2013 | Donovan et al. ................. 702/79 |
| 8,716,674 B2 * | 5/2014 | Sherwood .................. 250/423 P |
| 2001/0011892 A1 | 8/2001 | Ropke |
| 2002/0010527 A1 | 1/2002 | Wielebski et al. |
| 2002/0015389 A1 | 2/2002 | Wastlhuber et al. |
| 2003/0220702 A1 | 11/2003 | McNutt |
| 2004/0039456 A1 | 2/2004 | Davlin et al. |
| 2004/0078097 A1 | 4/2004 | Bruzy et al. |
| 2004/0117537 A1 | 6/2004 | Vandensande |
| 2005/0035733 A1 | 2/2005 | Karwath et al. |
| 2005/0055132 A1 | 3/2005 | Matsumoto et al. |
| 2005/0128100 A1 | 6/2005 | Petrocy |
| 2005/0128830 A1 | 6/2005 | Nishihara et al. |
| 2005/0228914 A1 | 10/2005 | Ishida |
| 2005/0267701 A1 | 12/2005 | McNutt |
| 2005/0273287 A1 | 12/2005 | McNutt |
| 2006/0030951 A1 | 2/2006 | Davlin et al. |
| 2006/0041630 A1 | 2/2006 | Naismith |
| 2006/0221984 A1 | 10/2006 | Denham |
| 2006/0224776 A1 | 10/2006 | Vanderhenst |
| 2006/0282592 A1 | 12/2006 | Zakriti |
| 2007/0094459 A1 | 4/2007 | Suzuki et al. |
| 2007/0198139 A1 | 8/2007 | Boran et al. |
| 2007/0236164 A1 | 10/2007 | Xia et al. |
| 2007/0236825 A1 | 10/2007 | Xia et al. |
| 2008/0061725 A1 | 3/2008 | Wu et al. |
| 2008/0098144 A1 | 4/2008 | Rees et al. |
| 2008/0115512 A1 | 5/2008 | Rizzo |
| 2008/0177397 A1 | 7/2008 | Davlin et al. |
| 2008/0189459 A1 | 8/2008 | Takeuchi |
| 2008/0288662 A1 | 11/2008 | Doorenbos |
| 2010/0185841 A1 | 7/2010 | Monreal |
| 2010/0211190 A1 | 8/2010 | Akita |
| 2011/0055442 A1 | 3/2011 | Ward et al. |
| 2012/0086442 A1 | 4/2012 | Haas et al. |
| 2012/0131231 A1 | 5/2012 | Monreal |
| 2012/0158335 A1 | 6/2012 | Donovan et al. |

FOREIGN PATENT DOCUMENTS

| | | |
|---|---|---|
| DE | 101 47 512 | 4/2003 |
| FR | 2885710 A1 | 11/2006 |
| GB | 2 353 448 | 2/2001 |
| JP | H1032479 | 2/1998 |
| JP | H11 85806 | 3/1999 |
| JP | 2003-044972 | 2/2003 |
| JP | 2003/279651 | 10/2003 |
| JP | 2006/242908 | 9/2006 |
| JP | 2007/272807 | 10/2007 |
| JP | 2008/22638 A | 1/2008 |
| JP | 2010/127857 | 6/2010 |

OTHER PUBLICATIONS

Japanese Office Action dated Feb. 5, 2015 (inicuding translation) for Japanese patent application No. 2013-544466; 5 pages.

Response to Japanese Office Action filed Mar. 27, 2015 (including English claims and letter from Yuasa and Hara dated Mar. 6, 2015) for Japanese patent application No. 2013-544466; 18 pages.

PCT Notification of Transmittal of the ISR & Written Opinion dated Apr. 23, 2015 corresponding to International Application No. PCT/US2015/011347; 1 Page.

PCT International Search Report dated Apr. 23, 2015 corresponding to International Application No. PCT/US2015/011347; 3 Pages.

PCT Written Opinion of the ISA dated Apr. 23, 2015 corresponding to International Application No. PCT/US2015/011347; 6 Pages.

Infineon, "TLE4998S3, TLE4998S4 Programmable Linear Hall Sensor;" Data Sheet, V. 1.0, Jul. 2008; 39 Pages.

Office Action including Engiish translation dated Mar. 9, 2015 for German Application No. 112011104425.9; 18 pages.

PSI5 Organization: Peripheral Sensor Interface for Automotive Applications; Jul. 29, 2008; PSI5 Technology Specification, V1.3, 47 pages.

Standard SAE J27162010-01. SENT—Single Edge Nibble Transmission for Automotive Applications; Apr. 2007, 56 pages.

German Office Action (with English Translation) dated May 18, 2015 corresponding to German Patent Application No. 112009004394.1; 33 Pages.

Response to Office Action flied Jul. 13, 2015 for German Patent Application No. 112011104425.9; 27 pages.

Korean Office Action (with English Translation) dated Mar. 31, 2014 for Korean Appl. No. 10-2012-7007744; 8 Pages.

Response to Korean Office Action dated Mar. 31, 2014 for Korean Appl. No. 10-2012-7007744; Response Filed May 23, 2014; 40 Pages.

Korean Notice of Decision of Refusal (with English Translation) dated Oct. 29, 2014 for Korean Appl. No. 10-2012-7007744; 6 Pages.

Response to Korean Notice of Decision of Refusal dated Oct. 29, 2014 for Korean Appl. No. 10-2012-7007744; Response filed on Jan. 27, 2015; 21 Pages.

Japanese Office Action English Translation dated Jan. 14, 2014 for Japanese Appl. No. 2012-526825; 3 Pages.

Japanese Final Decision of Rejection (with English Translation) dated Aug. 5, 2014 for Japanese Appl. No. 2012-526825; 4 Pages.

Appeal/Response (with English Translation of Claims) to Japanese Final Decision of Rejection dated Aug. 5, 2014 for Japanese Appl. No. 2012-526825; Appeal filed on Dec. 3, 2014; 18 Pages.

German Office Action (with English Translation) dated Oct. 16, 2012 for German Appl. No. 11 2009 004 394.1; 15 Pages.

Response to German Office Action (with English Translation) dated Oct. 16, 2012 for German Appl. No. 11 2009 004 394.1; Response filed on Feb. 18, 2013; 64 Pages.

Freescale Semiconductor, Advance Information "Two-Channel Distributed System Interface (DSI) Physical Interface Device", Document No. MC33790, Rev 11.0, Mar. 2008, 12 pages.

Freescale Semiconductor, Inc., "Distributed System Interface (DSI) Sensor Interface", Document No. MC33793/D, Motorola, Semiconductor Technical Data, Rev 10, Jul. 2003, 24 pages.

AN1816, Using the HC912B32 to Implement the Distributed Systems Interface (DSI) Protocol; by Tracy McHenry, Motorola, Freescale Semiconductor, Inc., Aug. 1999, 24 pages.

DSI Bus Standard, Version 2.02, TRW Automotive, Launched by Motorola, Freescale Semiconductor, Mar. 29, 2005, 18 pages.

PCT International Search Report dated Mar. 4, 2010 for Appl. No. PCT/US2009/066068; 3 Pages.

PCT Written Opinion of the International Searching Authority dated Mar. 4, 2010 for Appl. No. PCT/US2009/066068; 5 Pages.

PCT Notification Concerning Transmittal of IPR dated Jul. 28, 2011 for Appl. No. PCT/US2009/066068; 1 Page.

PCT International Preliminary Report dated Jul. 28, 2011 for Appl. No. PCT/US2009/066068; 1 Page.

(56) References Cited

OTHER PUBLICATIONS

PCT Written Opinion of the International Searching Authority dated Jul. 28, 2011 for Appl. No. PCT/US2009/066068; 4 Pages.
PCT Notification of Transmittal of the ISR and Written Opinion dated Oct. 18, 2010 for Appl. No. PCT/US2010/045403; 3 Pages.
PCT International Search Report dated Oct. 18, 2010 for Appl. No. PCT/US2010/045403; 3 Pages.
PCT Written Opinion of the International Searching Authority dated Oct. 18, 2010 for Appl. No. PCT/US2010/045403; 10 Pages.
PCT Notification Concerning Transmittal of IPR dated Mar. 8, 2012 for Appl. No. PCT/US2010/045403; 1 Page.
PCT International Preliminary Report dated Mar. 8, 2012 for Appl. No. PCT/US2010/045403; 1 Page.
PCT Written Opinion of the International Searching Authority dated Mar. 8, 2012 for Appl. No. PCT/US2010/045403; 9 Pages.
PCT Notification of Transmittal of the ISA and Written Opinion dated Mar. 21, 2012 for Appl. No. PCT/US2011/052861; 1 Page.
PCT International Search Report dated Mar. 21, 2012 for Appl. No. PCT/US2011/052861; 4 Pages.
PCT Written Opinion of the ISA dated Mar. 21, 2012 for Appl. No. PCT/US2011/052861; 10 Pages.
PCT Notification Concerning Transmittal of IPR dated Jun. 27, 2013 for Appl. No. PCT/US2011/052861; 1 Page.
PCT International Preliminary Report on Patentability dated Jun. 27, 2013 for Appl. No. PCT/US2011/052861; 1 Page.
PCT Written Opinion of the ISA dated Jun. 27, 2013 for Appl. No. PCT/US2011/052861; 9 Pages.
Japanese Office Action (with English Translation) dated Jul. 3, 2014 for Japanese Pat. Appl. No. 2013-544466; 8 Pages.
Response to Japanese Office Action (with English Claims) dated Jul. 3, 2014 for Japanese Pat. Appl. No. 2013-544466; Response filed Aug. 21, 2014; 11 Pages.
"3-Axis Digital Compass IC, HMC5883L;" Honeywell Advanced Information; XP-002671326; Oct. 2010; 18 Pages.
"Digital Temperature Sensor with I$^2$C™ Interface;" Burr-Brown Products from Texas Instruments; TMP100,TMP101; XP-002671327; Jan. 2002—Revised Nov. 2007; Package Option Addendum dated Aug. 20, 2011; 19 Pages.
"Single Edge Nibble Transmission for Automotive Applications;" SAE International; Surface Vehicle Information Report; SAE J2716 JAN2010; Issued Apr. 2007—Revised Jan. 2010; 56 Pages.
"The I$^2$C Bus Specification;" Version 2.1; Phillips Semiconductors; XP-002590803; dated Jan. 2000; 46 Pages.
"TMS320x281x, 280x DSP Serial Peripheral Interface (SPI) Reference Guide;" Texas Instruments; Literature No. SPRU059B; XP-002369243; Issued Jun. 2002—Revised Nov. 2004; 50 Pages.
U.S. Appl. No. 13/344,959.
U.S. Appl. No. 12/548,815.
U.S. Appl. No. 12/968,353.
Written Petition filed on Aug. 26, 2015 with English translation for Japanese Patent Application No. 2013-544466; 13 pages.
Examiner's Pre-Trial Report dated Jul. 3, 2015 for Japanese Application.

\* cited by examiner

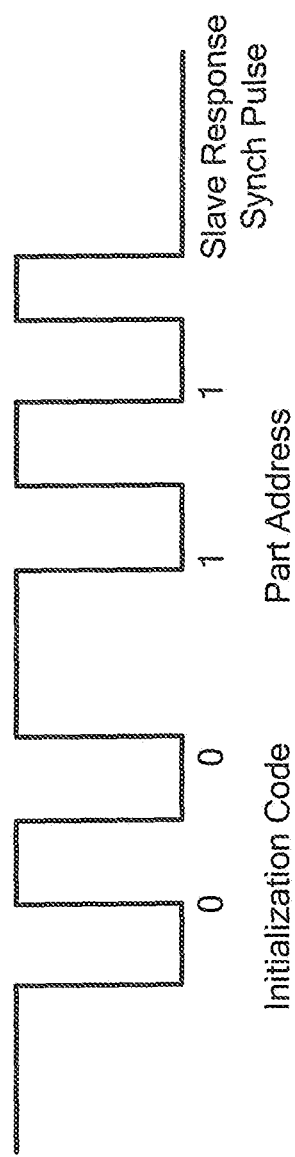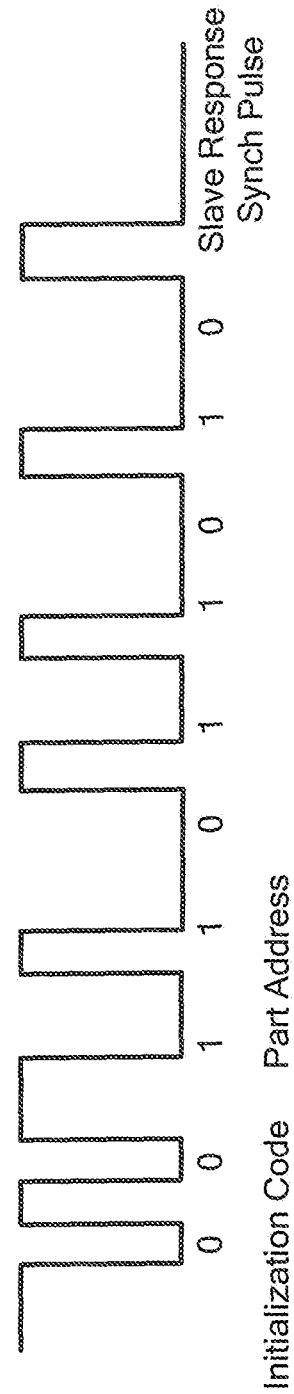
FIG. 5A
FIG. 5B

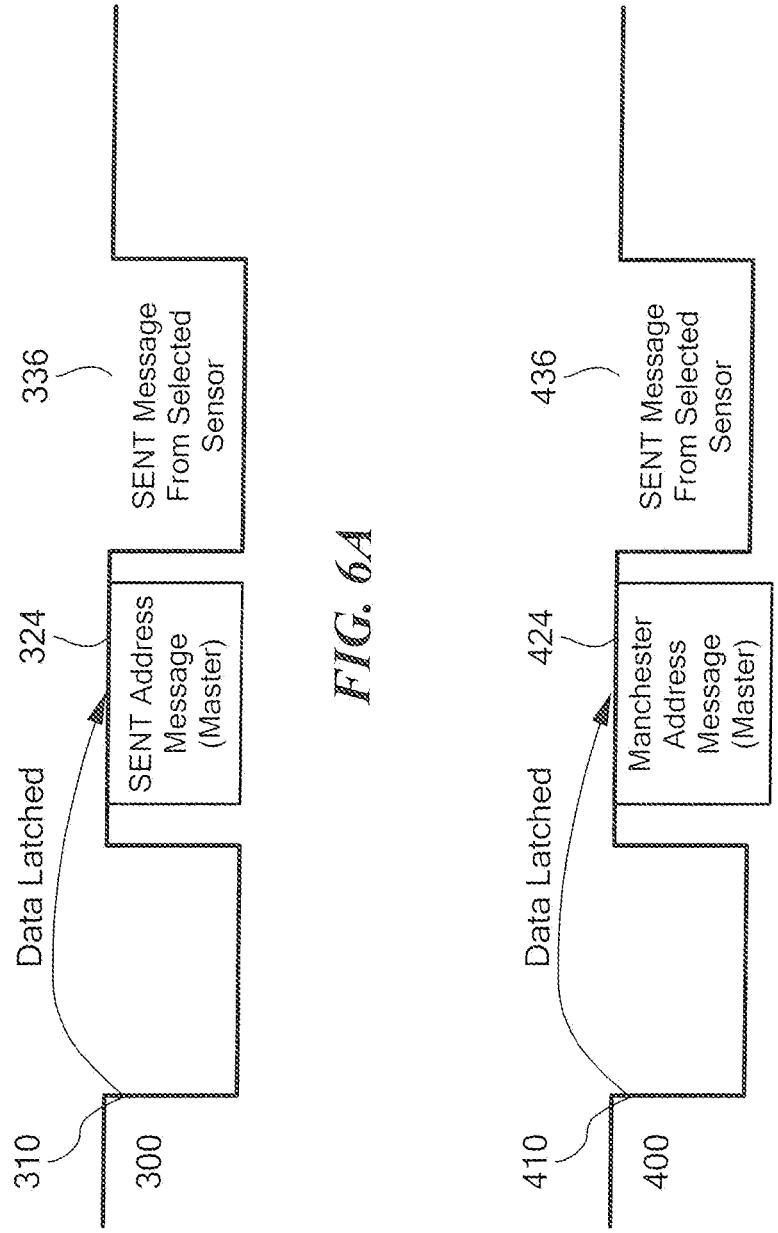

SIGNALING BETWEEN MASTER AND SLAVE COMPONENTS USING A SHARED COMMUNICATION NODE OF THE MASTER COMPONENT

BACKGROUND

Sensors are used to monitor various parameters of a system. For example, in vehicle systems, parameters such as current, speed, angle, linear position, and rotational direction of an article associated with a control module, such as a power steering module, a fuel injection module, and an anti-lock brake module, are often monitored. The sensor output signal is provided to a system controller, such as an Engine Control Unit (ECU), that processes the sensor output signal and may generate a feedback signal for desired operation of the control module. Conventionally, the sensor updates the sensed parameter periodically and the controller polls the sensor for data as needed for processing.

SUMMARY

In one aspect, a system includes a master component having a communication node; and a plurality of slave components. Each slave component has a bidirectional node. The slave components are configured to each store data in response to a trigger signal received at the bidirectional node from the communication node.

In another aspect, a system includes a controller having a communication node and a plurality of sensors. Each sensor includes a magnetic field sensing element responsive to a magnetic field associated with an article for providing a magnetic field output signal indicative of a magnetic field. Each sensor has a bidirectional node. The sensors are each configured to store sensor data in response to a trigger signal received at the bidirectional node from the communication node. The sensor data includes at least one of magnetic field data, temperature data, a fault condition or an internal memory value.

In a further aspect, a method for synchronizing sensor output data including sensing a characteristic at each of a plurality of sensors, generating sensor data indicative of the characteristic at each of the sensors and storing the sensor data for each of the sensors in response to a trigger signal received at a bidirectional node of each sensor from a communication node from a controller.

BRIEF DESCRIPTION OF THE DRAWINGS

FIG. 5A is an example of a trigger signal used to retrieve data from a selected sensor;

FIG. 5B is another example of a trigger signal used to retrieve data from a selected sensor;

FIG. 6A is a timing diagram of an example of a first trigger signal to store data at a sensor and a second trigger signal used to retrieve the data from the sensor using the communication node; and FIG. 6B is a timing diagram of an example of a first trigger signal to store data at a sensor and a second trigger signal used to retrieve the data from the sensor using the communication node.

DETAILED DESCRIPTION

As controllers operate at faster speeds, in many cases considerably faster than the sensor, it becomes advantageous for the controller to synchronize the sensor output data transmission so that the newest available data is provided for use by the controller. Not only is synchronizing the sensor output data transmission important but also the synchronization of the sampling of the sensor data when multiple sensors are used. Thus, information from multiple sensors may be derived with data sourced from the same moment in time.

Described herein are techniques for slave components to share a single communication node of a master component. In one example, multiple slave components respond in turn to one trigger sent from the communication node to the slave components. In another example, the slave components hold their data in response to the one trigger sent from the communication node and the data is read at a later time by another trigger signal. The data may be read using a Manchester encoded input that is sent from the communication node and is used to select a specific slave component for response. The data may also be read using a serial data signal such as a SENT message, for example.

Though sensors are used herein to represent slave components, one of ordinary skill in the art would recognize that there are other examples of slave components that may be used. Also, other sensors, controllers and other system embodiments not specifically described herein are described in U.S. Pat. No. 8,577,634, entitled "Systems and Methods for Synchronizing Sensor Data," which was issued Nov. 5, 2013 and has the same assignee as the present patent application and is incorporated herein in its entirety.

Figure 1:
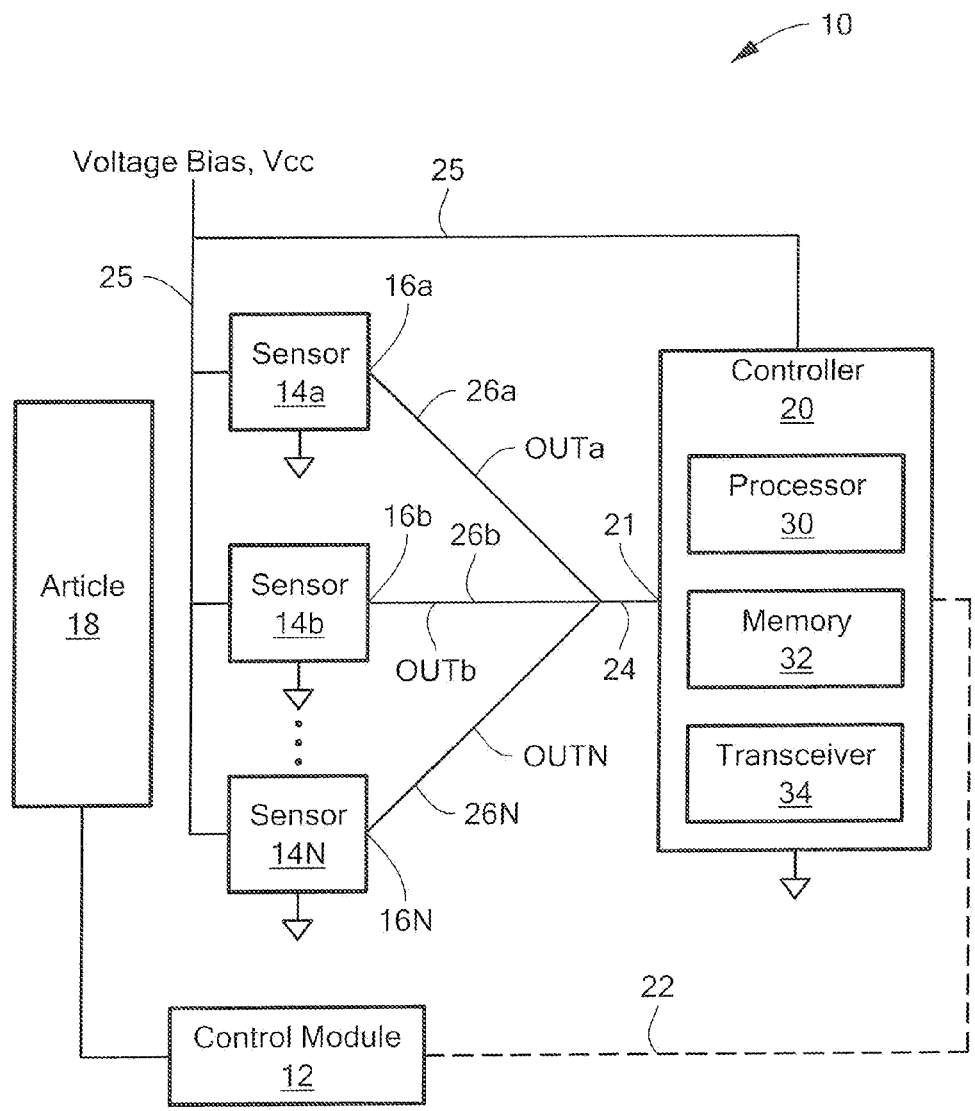
FIG. 1 is a block diagram depicting a sensor system with sensors sharing a communication node of the controller.

Referring to FIG. 1, a system 10 includes sensors 14a-14N configured to sense a parameter associated with an article 18 that may be controlled by a control module 12. Each of the sensors 14a-14N has a respective bidirectional node 16a-16N and is configured to generate, update, and optionally store (e.g., latch) sensor data. The sensors 14a-14N also are configured to communicate sensor data to a communication node 21 of a system controller 20 in a respective serial data signal 26a-26N from the respective bidirectional node 16a-16n in response to a trigger signal 24 from the communication node 21 of the controller 20 and received at the respective bidirectional node 16a-16N. The sensors 14a-14N are further coupled to the controller 20 via a power, or Voltage Bias, Vcc connection 25. The controller 20 may provide a feedback signal 22 to the control module 12 for use in controlling the article 18.

The sensors 14a-14N may additionally store the sensor data in response to the trigger signal. Communication buses, OUT1, OUT2, ... OUTN, may be coupled between the sensor 14a-14N and the communication node 21 of the controller 20. As will be described further herein each of the sensors 14a-14N is configured to at least monitor signals from the other sensors 14a-14N accessing the communication node 21. Thus, the communication node 21 is a shared node. One of ordinary skill in the art would recognize that the communication node 21 may be also a shared bus.

With this arrangement, communicating sensor data is synchronized by the trigger signal 24 received at the bidirectional nodes 16a-16N, which are the same nodes at which the sensor output data are provided in the serial data signals 26a-26N.

Sensor data synchronization in this manner can reduce sensor output data latency and also reduces the number of sensor connections otherwise required to permit receipt of an external synchronization signal by the sensor. A reduced pin count not only reduces cost and circuit area, but also reduces effects of electromagnetic interference (EMI). In some embodiments in which both the data storing function and the output data transmission function are synchronized in this manner, ambiguities in the age of the sensor output data can be reduced or eliminated (e.g., multiple sensors are told to sample their data at the same time using a single trigger).

The sensors 14a-14N may sense various parameters of an article 18, including, but not limited to current, speed, angle, linear position, turns count (e.g., for angular sensors or steering wheel applications) and rotational direction. For example, the control module 12 may be a vehicle power steering module, in which case the article 18 may be a magnet associated with the steering unit and the sensor 14a may sense the strength of a magnetic field associated with the magnet for use by the controller 20 to determine an angle of the wheel or steering column. In another example, the control module 12 may be a fuel injection module in which case the article 18 may be a camshaft gear and the magnetic field strength associated with the gear can be sensed by the sensors 14a-14N and used by the controller to determine the speed of rotation and/or the rotational position of the gear. More generally however, the sensors 14a-14N sense a characteristic associated with the article, such as magnetic field strength in the illustrative embodiments, and the controller 20 processes the sensor output data to arrive at the desired parameter information, such as speed or direction of rotation. It will be appreciated by those of ordinary skill in the art that the concepts described herein have applicability to various systems, sensors, articles, control modules, sensed characteristics, and parameters, including closed loop systems as shown and open loop systems.

The controller 20 may take various forms depending on the sensor system 10 and its application. For example, in the case of a vehicle system, the controller 20 may be an Engine Control Unit (ECU) that includes a processor 30, a memory 32, and a transceiver 34 for controlling various aspects of vehicle safety and operation.

The serial data signals 26a-26N provided by the sensors 14a-14N at the sensor bidirectional nodes 16a-16N have a standard unidirectional signal format. Suitable unidirectional signal formats include Single-Edge Nibble Transmission (SENT), Serial Peripheral Interface (SPI), Peripheral Serial Interface 5 (PSI5) and Inter-Integrated Circuit ($I^2C$). In the illustrative embodiment, the serial data signals 26a-26N is in the SENT format as defined by a Society of Automotive Engineers (SAE) J2716 Specification which is hereby incorporated by reference in its entirety and as described generally in connection with FIG. 3. In one example, the serial data signal includes one or more of a serial binary signal and a pulse width modulated (PWM) signal.

Each of the sensors 14a-14N may sense the same characteristic of a single article 18 associated with a single control module 12 as may be desirable for redundancy or in sensor systems in which multiple sensors are necessary to provide the desired data, such as for direction detection and angle detection with multiple CVH sensor die. Alternatively, each sensor 14a-14N may sense a different characteristic associated with the same or different articles, which articles are associated with the same or with different control modules.

As noted above and described below, the sensor data is communicated in a serial data signal (e.g., 26a-26N) in response to detection of a trigger signal (e.g., 24) (sent from a communication node (e.g., 21) of a controller (e.g., 20)), received at the bidirectional node (e.g., 16a-16N) and optionally is additionally stored in response to detection of the trigger signal. In embodiments in which both sensor data storing and transmission functions occur in response to the trigger signal, the data storing and data communication functions may occur in response to detection of same feature of the trigger signal 24, resulting in common control of the storing and data communication functions by the trigger signal 24. Alternatively, the sensor data may be stored in response to detection of a first feature of the trigger signal 24 and the stored data may be communicated in the serial data signal 26a-26N in response to detection of a second feature of the trigger signal 24, resulting in independent control of the storing and data communication functions by the trigger signal 24. Such independent control functions may be particularly advantageous in systems in which a plurality of sensors are used (e.g., for redundancy) to sense the same parameter, since it may be desirable to have all of the sensors sample and store (i.e., hold) the sensor data at the same time, but communicate the stored sensor data at different times as best suited for processing by the controller.

Figure 2:
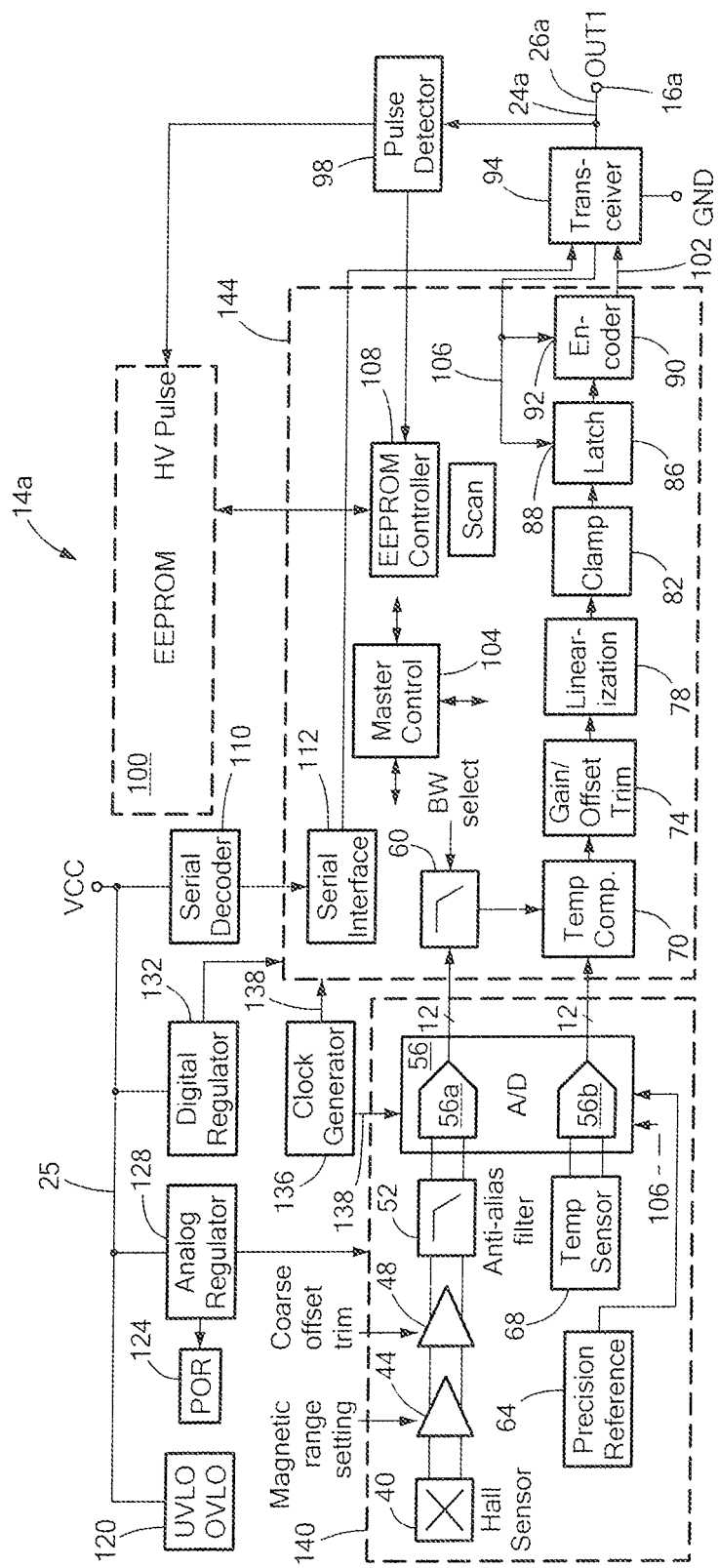
FIG. 2 is a block diagram showing a magnetic field sensor suitable for use in the sensor system of FIG. 1.

Referring also to FIG. 2 in which like elements are labeled with like reference characters, an illustrative sensor 14a includes a sensing element 40, here a magnetic field sensing element, such as a Hall Effect element (e.g., a circular vertical Hall). Other types of magnetic field sensing elements such as magnetoresistive elements (for example, a giant magnetoresistance (GMR) element, an anisotropic magnetoresistance (AMR) element, a tunneling magnetoresistance (TMR) element, a magnetic tunnel junction (MTJ) element, a spin valve element, an Indium antimonide (InSb) sensor, a Gallium Arsenide (GaAs) sensor), and circular vertical Hall Element are also suitable. Furthermore, the sensing element 40 may sense other types of characteristics such as temperature, pressure and so forth. The sensing element 40 may be a single ended or differential arrangement and may include one or more individual sensing elements in various known configurations.

The magnetic field sensing element 40 is coupled to interface signal processing circuitry which may include one of more of the following circuits and which generates sensor data that is provided to the controller 20 (FIG. 1) via the serial data signal 26a. An amplifier 44 allows for setting the magnetic field range to be sensed and a further amplifier 48 may permit a course adjustment of the offset. In one illustrative embodiment, the magnetic field range may be selected to be between approximately +/−100 Gauss to +/−2250 Gauss. Offset refers to the degree to which the sensed magnetic field signal (i.e., the output of the sensing element 40) is centered at zero magnetic field. An output of the amplifier 48 is filtered, here by an anti-aliasing filter 52, to provide a filtered signal to an analog-to-digital (A/D) converter 56 that receives a precision reference voltage from reference 64 and a clock signal 138 from a clock generator 136, as shown. Here, the A/D converter 56 includes a first converter 56a configured to provide a 12-bit output indicative of the level of the sensed magnetic field to a further filter, here a low pass filter 60.

The sensor 14a may include a temperature compensation circuit 70 to compensate the sensed magnetic field signal for changes due to temperature. To this end, a temperature sensor 68 senses an ambient temperature of the sensor 14a and provides an analog signal indicative of the temperature to an A/D converter 56b, as shown. Converter 56b provides, for example, a 12-bit output signal indicative of the ambient temperature to the temperature compensation circuit 70. In the illustrative embodiment, the temperature compensation circuit 70 implements a polynomial fit of the temperature signal from converter 56b to a temperature correction equation in order to cancel the deleterious effects of temperature variations on device sensitivity and offset, where sensitivity refers to a change in output signal level per change in Gauss level.

An output of the temperature compensation circuit 70 is coupled to a gain/offset trim circuit 74 which may employ various conventional techniques for gain and offset adjustment. A linearization circuit 78 is used to linearize the sensor output in response to non-linear magnetic fields. To this end, the output signal range is divided into a predetermined number of segments, such as thirty-two equal segments, and the linearization circuit 78 applies a linearization coefficient factor to each segment. The linearization coefficients may be stored in a look-up table in an EEPROM as described in U.S. Pat. No. 8,350,563, which is entitled "Magnetic Field Sensor and Method Used in a Magnetic Field Sensor that Adjusts a Sensitivity and/or an Offset Over Temperature" and issued Jan. 8, 2012 and has the same assignee as the present patent application and is incorporated herein in its entirety.

A clamp 82 coupled to the output of the linearization circuit 78 permits signal limiting and provides digital sensor data thus processed to the latch 86.

A latch 86 receives and stores (i.e., latches) digital sensor data from the interface circuitry. The latch 86 may be responsive to a trigger signal (e.g., 24, FIG. 1) received at the bidirectional node 16a to cause the digital sensor data to be stored. More particularly, a buffered version of the trigger signal 24 (i.e., signal 106) is provided to a control node 88 of the latch 86 and contains the buffered trigger signal for detection by the latch 86. In other embodiments, the data is stored by the latch 86 independently of the trigger signal 24. An output node of the latch is coupled to an encoder 90, as shown.

The encoder 90 is configured to communicate the sensor data, here digital sensor data, in the serial data signal 26a at the bidirectional node 16a in response to the trigger signal 24 received at the bidirectional node 16a. In the illustrative embodiment, the serial data signal 26a has a standard unidirectional signal format and, in particular has the SENT format. More particularly, signal 106 provided by the transceiver to a control node 92 of the encoder contains the trigger signal for detection by the encoder. The encoder 90 provides the serial data signal 26a at the bidirectional sensor node 16a via a transceiver 94.

In view of the above description, it will be apparent that in the illustrative embodiment, the latch 86 stores digital sensor data in response to the trigger signal 24 and the serial data signal 26a is a digital signal. However, it will be appreciated by those of ordinary skill in the art that alternatively, the sensor data may be stored and/or communicated to the controller 20 in analog form, by analog circuitry and techniques accordingly.

It will also be appreciated by those of ordinary skill in the art that the sensor data may not be "sampled and stored" in a conventional fashion with a dedicated storage device. In one example, the latch 86 may be eliminated and the trigger signal 24 in the form of buffered signal 106 may be provided to a control node of the A/D converter 56a (as shown in phantom in FIG. 2), in which case generating and/or updating of the sensor data occurs in the A/D in response to the trigger signal 24, as may be advantageous.

The sensor 14a includes an EEPROM 100 in which programmable registers store user selections for programmable features. Various schemes are suitable for programming communication between the controller 20 and the sensor 14a.

A Manchester encoding scheme is used with which the controller 20 sends commands to the sensor 14a via the Vcc connection 25, such as a Write Access Command, a Write Command, and a Read Command. In response to a Read Command, the sensor 14a responds with a Read Acknowledge signal via bus OUT1 that contains the requested data.

A serial decoder 110 translates the Vcc signal level (e.g., having a signal of 5-8 volts) into a logic signal and a serial interface 112 decodes the resulting logic signal into a binary command signal. For example, in the case of a Write Command, the binary command signal at the output of the serial interface 112 indicates to an EEPROM controller 108 the address of the register to be written and the data to be written. A Write Access Command unlocks the device for writing. In the case of a Read Command, the binary signal output of the serial interface 112 presents the contents of the selected register to the transceiver for communication at the bidirectional node 16a.

In order to write to the EEPROM, the controller 20 (FIG. 1) sends a Disable Output Command to put the bidirectional node 16a into a high impedance state. The controller 20 also sends high voltage pulses to the sensor in order to boost the voltage on the EEPROM gates. To this end, a pulse detector 98 is coupled to the bidirectional node 16a and to the EEPROM controller 108. After writing is complete, the controller 20 sends an Enable Output Command to bring the bidirectional node 16a from its high impedance state to a value indicative of the sensed magnetic field. Preferably, the bidirectional node 16a is also put into a high impedance state before a Read Command is sent until after the Read Acknowledge signal is returned.

Various features of the sensor 14a are programmable in the above-described manner, including but not limited to the magnetic field range via amplifier 44, the course offset trim via amplifier 48, the bandwidth via filter 60 and so forth. According to the invention, a sensor data communication mode is also programmable. Specifically, the sensor 14a can be programmed to dictate whether the sensor data is communicated to the controller in a conventional manner (independent of any synchronization by the controller) or according to the invention (in response to receipt of the trigger signal 24 from the controller 20 at the sensor bidirectional node 16a). Additional programmable features relate to the SENT signal format as described below.

Additional features of the sensor 14a may include an undervoltage/overvoltage lockout circuit 120 and a power-on reset (POR) circuit 124. The undervoltage/overvoltage lockout circuit 120 senses the voltage level of the Vcc signal 25, sending an error signal to the Master Control block 104 if a predetermined range is exceeded (For example, it is these types of faults, along with temperature sensor information that may be read out of an addressed device over the main interface (SENT). In addition, specific registers/EEPROM in the addressed/shared device may also be written to). The POR circuit 124 pauses critical circuitry upon power-up until Vcc reaches an appropriate voltage level.

The sensor 14a may be provided in the form of an integrated circuit, here with an analog front-end portion 140 and a digital subsystem 144. An analog voltage regulator 128 provides a regulated voltage to the analog front-end 140 and a digital regulator 132 powers the digital subsystems 144, as shown. Clock generator 136 provides clock signals to the A/D converter 56 and to the master controller 104. It will be appreciated by those of ordinary skill in the art however, that the particular delineation of which circuit functions are implemented in an analog fashion or with digital circuitry and signals can be varied. Also circuit functions that are shown to be implemented on the integrated circuit sensor 14a can be accomplished on separate circuits (e.g., additional integrated circuits or circuit boards).

Figure 3:
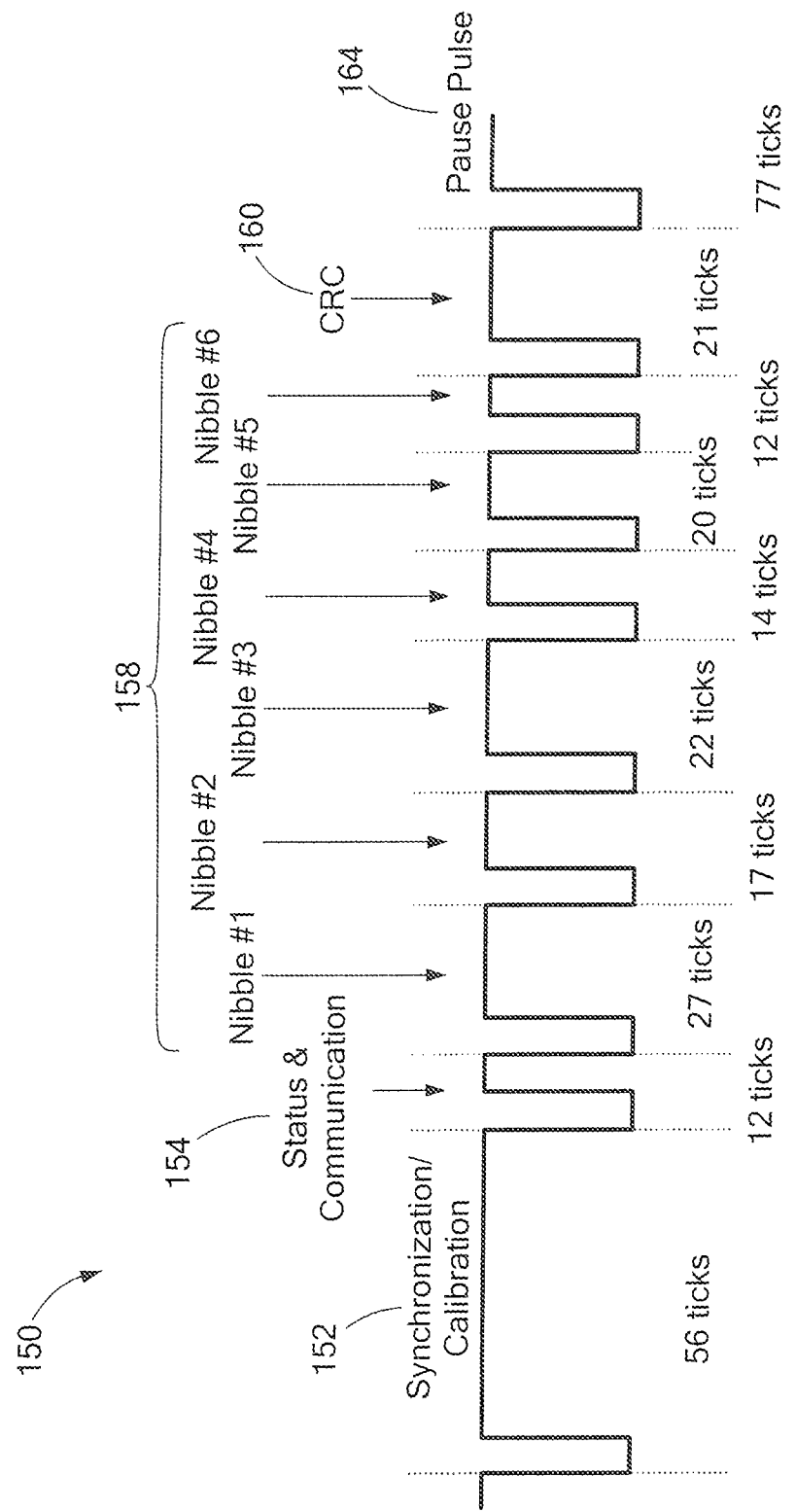
FIG. 3 is a timing diagram showing the SENT signal format.

Referring also to FIG. 3, the serial data signals 26a-26N communicated by the sensor 14a-14N may have a standard unidirectional signal format, such as the illustrative SENT signal format. A SENT signal 150 consists of a sequence of pulses which is repeatedly sent by the transmitting module (here, the sensor 14a). The SENT signal 150 includes at least four portions: a Synchronization/Calibration portion 152, a Status and Serial Communication portion 154, a Data portion 158, and a Checksum (or cyclic redundancy check, CRC) portion 160. A "tick" refers to the nominal clock signal period and a "nibble" is 4 bits. Each nibble has a specified time for low and high state. The low state duration is by default 5 ticks and the high state duration is dictated by the information value of the nibble. The Synchronization/Calibration portion 152 identifies the start of the SENT message and always has a pulse duration of 56 ticks. Status and Serial Communication portion 154 is used to inform the controller 20 of the sensor status or features (such as part numbers or error code information) and has a duration of between 12 and 27 ticks to provide 4 bits. The Data portion 158 includes up to six nibbles of data, with each nibble containing 4 bits with values ranging from 0 to 15. Thus, each data nibble has a pulse duration from 12 to 27 ticks. The number of data nibbles will be fixed for each application but can vary between applications. In order to transmit two 12 bit values, 6 data nibbles are communicated, as shown.

The SENT signal 150 includes an optional pause portion 164 that is used in connection with the invention in order to permit bidirectional communication via the bidirectional sensor node 16a. In general, the pause portion 164 corresponds to a period of inactivity on the output bus, OUT1, (FIG. 1) or in other words, a time when the serial data signal 26a (FIG. 1) is inactive or high. Conventionally, the pause portion 164 is sometimes used to prolong the SENT signal to a constant length if desired. The user can program a particular desired frame rate via the programming scheme as described above. It will be appreciated by those of ordinary skill in the art that inactivity on the output bus, OUT1, may alternatively correspond to a low (pull down) signal level.

According to the invention, the pause portion 164 is used to permit bidirectional communication on the output bus, OUT1, by allowing for the trigger signal 24 received at the sensor bidirectional node 16a during the pause portion to control data functions of the sensor. It will be appreciated by those of ordinary skill in the art that the SENT signal pause portion 164 represents a part of the signal when neither data nor control information is transmitted by the sensor and thus, may be referred to more generally as the inactive transmission portion 164.

Various aspects of the SENT signal format can be user programmed, for example, in the EEPROM 100 of FIG. 2. As examples, a SENT_STATUS parameter can be used to indicate the desired format for the four bit Status and Serial Communication portion 154, a SENT_SERIAL parameter can be used to select a desired format for a serial data signal embedded in successive SENT messages according to the SENT specification, comprising a short serial message format of 8 bits, an enhanced serial message format of 12 bits, or a further enhanced serial message format of 16 bits. A SENT_DATA parameter can be used to specify the particular sensor data to be communicated in the data nibbles. For example, one value of the SENT_DATA parameter may indicate that three data nibbles represent magnetic field data and three data nibbles represent temperature data. A SENT_TICK parameter can used to specify the nominal tick time. A SENT_LOVAR parameter can be used to depart from the SENT standard of having a fixed low state time in each nibble to having the high state time fixed instead. And a SENT_FIXED parameter can be used to depart from the SENT standard by specifying a different defined length of the fixed portion of each nibble.

A SENT_UPDATE parameter is used to specify a desired data communication mode. In one mode of data communication, sensor data is stored in response to detection of a first feature of the trigger signal 24 and is communicated in response to a detection of second feature of the trigger signal 24 (see, for example, FIG. 5). In other examples, sensor data is both stored and communicated to the controller 20 (FIG. 1) in response to detection of a single feature of the trigger signal 24. Other data communication modes are also possible, such as a mode in which the trigger signal controls only generating/updating the sensor data (such as via the A/D converter 56 of FIG. 2), a mode in which the trigger signal only controls communication of the serial data signals 26a-26N and any sensor data generating/updating and/or dedicated sensor data storage occurs independently of the trigger signal, a mode in which the trigger signal resets certain sensor circuitry (such as clock generator 136, registers, or counters) such as a mode in which any combination of these sensor functions is controlled by the trigger signal, or a mode in which the serial data signal 26a does not include the optional pause portion 164. For example, the trigger signal may, alternatively, control only one such function (data sampling, storing or communication) or any combination of sensor data storing, updating, resetting and transmitting functions.

Figure 4:
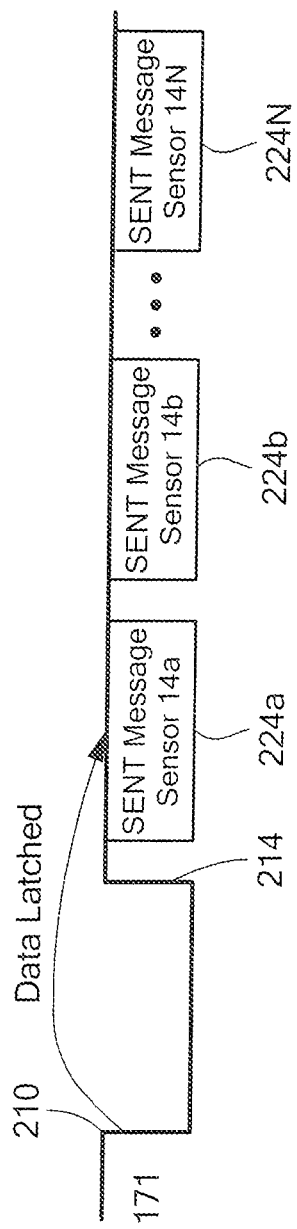
FIG. 4 is a timing diagram showing a trigger signal sent to a plurality of sensors of FIG. 1 to illustrate the timing of sensor data storing and transmission of the respective serial data signal by each of the sensors under the control of the trigger signal.

Referring also to FIG. 4, in one mode of data communication, sensor data is stored in response to detection of a trigger signal received at the sensor bidirectional node and is communicated to the controller. FIG. 4 shows a signal transmission 171 from the controller 20 to the sensors 14a-14N for the sensor system 10 (FIG. 1). Each sensor 14a-14N is responsive to a first feature 210, shown in FIG. 4 as a falling edge, of a received trigger signal 96 for storing sensor data and to a second feature 214, shown in FIG. 4 as a rising edge, of the received trigger signal for transmitting the stored sensor data in a serial data signal. The first feature 210 may be used by sensors (e.g., linear and angle sensors) as a trigger mechanism to multiple devices to trigger the sampling of data by the sensors.

The sensors 14a-14N detect the first feature 210a of the trigger signal, here a falling edge, samples and stores their respective sensor data in the latch 86 in response. The sensors 14a-14N further detect the second feature 214a of the trigger signal, here a rising edge. Each sensor 14a-14N responds in turn (sequentially) based on a previously configured order. In one particular example, sensor 14a sends a SENT message 224a; after sensor 14a sends the SENT message 224a, the sensor 14b sends a SENT message 224b; and so forth with the sensor 14N sending the last SENT message 224N.

The first sensor in the previously configured order would respond with a serial data signal while the remaining sensors start monitoring the serial data signals from the other sensors to determine when it may send its message. In one example, the previously configured order would be stored in the EEPROM or another type of non-volatile device. In one example, in the event that a next sensor determines that there is no message within a specified amount of time coming from the previous sensor in the previously configured order, the next sensor responds with its serial data signal and a notification that it did not detect the message from the previous sensor. In one example, each sensor may report its identification (address or identifier bit stream) in its Status Nibble. In other examples, based on an address of a particular device the sensor could provide more than just Hall magnetic field data. The sensor could, for example, further provide temperature sensor data or error flag status IF in a read mode command.

In other examples, the sensors 14a-14N would listen to the messages sent by the other sensors. For example, the sensors may compare their output values and register a plausibility error if the sensor's values should be matched. In other examples, other information may be compared such as temperature values between sensors.

While the trigger signal features used in this embodiment are signal edges of a particular direction, various other signal features would alternatively be used, including but not limited to one or more signal pulses (i.e., detection of first and second, opposite edge directions), multiple edge detections of the same or different directions and so forth.

In other examples, a trigger signal from the controller 20 does not necessitate a response from the sensor components 14a-14N that includes data. In one example, no response is required. In another example, the sensor components 14a-14N may send a response that does not include data; but rather, the response is, for example, an acknowledgment signal that indicates that the trigger signal was received by the sensor.

In one particular example, a trigger signal may include a number of toggling pulses issued from the controller where the pulses are separated by a small number of ticks. In another particular example, a trigger signal may be used that includes an address not used by the sensors 14a-14N. In one particular example, sensors have addresses 00, 01 and 10; and 11 is used as a trigger signal. For example, the trigger signal would instruct all devices to sample the magnetic field level at this specific time.

Referring to FIG. 5A, if the trigger signal instructs the sensors 14a-14N to store their data but not send the data to the controller 20, then an additional trigger signal is used to retrieve the data. In particular, a second trigger signal may be directed at one specific sensor or a subset of the sensors 14a-14N. For example, the second trigger signal may be a Manchester encoded signal. The sensors 14a-14N receiving signals from the communication node 21 will listen to the encoded signal and if a sensor recognizes that it is being addressed sends its data. For example, the sensor sends a serial data signal. FIG. 5A depicts one particular example, where two zero's are transmitted in a row followed by a 2-bit sensor address flowed by a portion to allow the sensor response.

Referring to FIG. 5B, in another particular example, the address bits may be extended from just 2 bits to, for example, 8 bits, to address internal registers in a sensor device. For example, the first 2 bits of the Address field could be for addressing the particular slave device, the next 2 bits bit could be used to indicate a coded Read/Write message, and then the remaining 4 bits could be used for addressing an internal register/EEPROM in the device.

Referring to FIG. 6A, in another example of retrieving data from the sensors 14a-14N, a serial data signal message may be sent from the controller 20 to the sensors 14a-14N but intended for one of the sensors. For example, the serial data signal may be a SENT message as described in FIG. 3. The selected sensor would interpret the SENT message in the same manner the controller 20 would. FIG. 6A depicts a transmission signal 300 that includes a falling edge 310 which signals the sensors 14a-14N to store their data. The controller 20 sends a SENT message 324 that triggers one of the sensors 14a-14N to respond by sending its data in a SENT message 336. For example, the SENT message is the SENT signal 150 described in FIG. 3 that includes fifty-six ticks for synchronization followed by one or more Nibbles. In one example, the SENT message 324 from the controller 20 includes an address of the desired sensor to respond. For example, a Nibble may include a 4-bit address. In one example, the SENT message 324 may include a cyclic redundancy check (CRC).

Referring to FIG. 6B, in another example, a transmission signal 400 that includes a falling edge 410 which signals the sensors 14a-14N to store their data. The controller 20 sends a Manchester message 424 (e.g., such as described in FIGS. 5A and 5B) that triggers one of the sensors 14a-14N to respond by sending its data in a SENT message 436.

Having described preferred embodiments, which serve to illustrate various concepts, structures and techniques, which are the subject of this patent, it will now become apparent to those of ordinary skill in the art that other embodiments incorporating these concepts, structures and techniques may be used.

Accordingly, it is submitted that that scope of the patent should not be limited to the described embodiments but rather should be limited only by the spirit and scope of the following claims. Elements of different embodiments described herein may be combined to form other embodiments not specifically set forth above.

What is claimed is:

1. A system, comprising:
   a master component having a communication node; and
   a plurality of slave components, each slave component having a bidirectional node, the slave components being configured to each store data in response to a trigger signal received at the bidirectional node from the communication node,
   wherein each of the slave components are further configured to communicate the stored data in a serial data signal from the bidirectional node to the communication node in response to the trigger signal received at the bidirectional node from the communication node,
   wherein the slave components communicate the stored data in an order, and
   wherein each of the slave components monitors serial data signal from the other slave components to the communication port.

2. The system of claim 1, wherein the data comprises at least one of magnetic field data, temperature data, a fault condition or an internal memory value.

3. The system of claim 1, wherein each slave component is further configured to send a notification if a previous sensor in the order does not send a serial data signal.

4. The system of claim 1, wherein the slave components are configured to store the data in response to detection of at least one feature of the trigger signal.

5. The system of claim 4, wherein the at least one feature of the trigger signal is a predetermined edge direction.

6. The system of claim 1, wherein the trigger signal is a first trigger, and
   wherein the slave components are further configured to communicate data in a serial data signal from the bidirectional node to the communication node in response to a second trigger signal received at the bidirectional node from the communication node.

7. The system of claim 6, wherein the second trigger signal comprises an address of a slave component.

8. The system of claim 7, wherein the second trigger further comprises an address of a component within the slave component.

9. The system of claim 8, wherein the address of the component within the slave component comprises a memory or register location.

10. The system of claim 6 wherein the second trigger signal is a Manchester encoded signal.

11. The system of claim 6 wherein the second trigger signal is a serial data signal.

12. The system of claim 11, wherein the serial data signal has a unidirectional signal format selected from Single-Edge Nibble Transmission (SENT), Serial Peripheral Interface 5 (SPI5), or Serial Peripheral Interface (SPI).

13. The system of claim 1, wherein the slave components are configured to sample and store the data in response to detection of a first feature of the trigger signal and are configured to communicate the stored data in the serial data signal in response to detection of a second feature of the trigger signal.

14. The system of claim 13, wherein the first feature of the trigger signal is a first predetermined edge direction and wherein the second feature of the trigger signal is a second, opposite edge direction.

15. The system of claim 1, wherein at least one of the slave components is a sensor.

16. The system of claim 1, wherein at least one of the slave components is a magnetic field sensor.

17. The system of claim 1, wherein the serial data signal has a unidirectional signal format selected from Single-Edge Nibble Transmission (SENT), or Serial Peripheral Interface 5 (SPI5).

18. The system of claim 1, wherein the slave components communicate the stored data in the serial data signal in response to detection of at least one feature of the trigger signal.

19. The system of claim 18, wherein the at least one feature of the trigger signal is a predetermined edge direction.

20. A system, comprising:
a master component having a communication node; and
a plurality of slave components, each slave component having a bidirectional node, the slave components being configured to each store data in response to a trigger signal received at the bidirectional node from the communication node and to communicate the stored data in a serial data signal from the bidirectional node to the communication node in response to the trigger signal received at the bidirectional node from the communication node,
wherein the slave components communicate the stored data in an order, and
wherein each of the slave components are configured to compare its data with data from the other slave components.

21. The system of claim 20, wherein the serial data signal has a unidirectional signal format selected from Single-Edge Nibble Transmission (SENT), or Serial Peripheral Interface 5 (SPI5).

22. The system of claim 20, wherein the slave components communicate the stored data in the serial data signal in response to detection of at least one feature of the trigger signal.

23. The system of claim 22, wherein the at least one feature of the trigger signal is a predetermined edge direction.

24. A system, comprising:
a master component having a communication node; and
a plurality of slave components, each slave component having a bidirectional node, the slave components being configured to each store data in response to a first trigger signal received at the bidirectional node from the communication node and to communicate data in a serial data signal from the bidirectional node to the communication node in response to a second trigger signal received at the bidirectional node from the communication node,
wherein the second trigger signal comprises:
an address of a slave component;
an address of a component within the slave component; and
an indicator to indicate whether to read or write data to the slave component.

25. A system, comprising:
a controller having a communication node; and
a plurality of sensors, each sensor comprising a magnetic field sensing element responsive to a magnetic field associated with an article for providing a magnetic field output signal indicative of a magnetic field, each sensor having a bidirectional node, the sensors being each configured to store sensor data in response to a first trigger signal received at the bidirectional node from the communication node,
wherein the sensor data comprises at least one of magnetic field data, temperature data, a fault condition or an internal memory value,
wherein the sensors are further configured to communicate sensor data in a serial data signal from the bidirectional node to the communication node in response to a second trigger signal received at the bidirectional node from the communication node,
wherein the second trigger signal comprises:
an address of a sensor;
an address of a component within the sensor; and
an indicator to indicate whether to read or write data to the sensor.

26. The system of claim 25, wherein each of the sensors are further configured to communicate the stored sensor data in a serial data signal from the bidirectional node to the communication node in response to the trigger signal received at the bidirectional node from the communication node.

27. The system of claim 26, wherein the serial data signal has a unidirectional signal format selected from Single-Edge Nibble Transmission (SENT), Serial Peripheral Interface 5 (SPI5), or Serial Peripheral Interface (SPI).

28. The system of claim 26, wherein the sensors communicate the stored sensor data in the serial data signal in response to detection of at least one feature of the trigger signal.

29. The system of claim 25, wherein the sensors are configured to store the sensor data in response to detection of at least one feature of the trigger signal.

30. The system of claim 25, wherein the address of the component within the sensor comprises a memory or register location.

31. The system of claim 25, wherein the second trigger signal is a Manchester encoded signal.

32. The system of claim 25, wherein the second trigger signal is a serial data signal.

33. The system of claim 32, wherein the serial data signal has a unidirectional signal format selected from Single-Edge Nibble Transmission (SENT), or Serial Peripheral Interface 5 (SPI5).

34. The system of claim 25, wherein the sensors are configured to sample and store the data in response to detection of a first feature of the trigger signal and are configured to communicate the stored data in the serial data signal in response to detection of a second feature of the trigger signal.

* * * * *

UNITED STATES PATENT AND TRADEMARK OFFICE
CERTIFICATE OF CORRECTION

Page 1 of 1

PATENT NO. : 9,172,565 B2
APPLICATION NO. : 14/182595
DATED : October 27, 2015
INVENTOR(S) : Bryan Cadugan et al.

It is certified that error appears in the above-identified patent and that said Letters Patent is hereby corrected as shown below:

Specification

Column 1, Line 40, delete "including" and replace with --includes--.

Column 4, Line 7, delete "of same" and replace with --of the same--.

Column 4, Line 40, delete "one of" and replace with --one or--.

Column 6, Line 50, delete "(For" and replace with --(for--.

Column 8, Line 1, delete "can used" and replace with --can be used--.

Column 8, Line 12, delete "of second" and replace with --of a second--.

Column 9, Line 53, delete "bits bit could" and replace with --bits could--.

Column 10, Line 10, delete "400 that includes" and replace with --400 includes--.

Column 10, Line 21, delete "that that" and replace with --that the--.

Signed and Sealed this
Third Day of May, 2016

Michelle K. Lee
*Director of the United States Patent and Trademark Office*